(12) United States Patent
Shifman et al.

(10) Patent No.: US 11,332,175 B2
(45) Date of Patent: May 17, 2022

(54) SELF ORGANIZING CYBER RAIL-COP

(71) Applicant: Cylus Cyber Security Ltd., Tel Aviv (IL)

(72) Inventors: Michael Shifman, Tel Aviv (IL); Amir Levintai, Tel Aviv (IL)

(73) Assignee: Cylus Cyber Security Ltd., Tel Aviv (IL)

(*) Notice: Subject to any disclaimer, the term of this patent is extended or adjusted under 35 U.S.C. 154(b) by 0 days.

(21) Appl. No.: 17/257,329

(22) PCT Filed: May 18, 2020

(86) PCT No.: PCT/IB2020/054679
§ 371 (c)(1),
(2) Date: Dec. 31, 2020

(87) PCT Pub. No.: WO2020/230110
PCT Pub. Date: Nov. 19, 2020

(65) Prior Publication Data
US 2022/0055671 A1 Feb. 24, 2022

Related U.S. Application Data

(60) Provisional application No. 62/848,616, filed on May 16, 2019.

(51) Int. Cl.
*B61L 27/70* (2022.01)
*G06N 3/04* (2006.01)
(Continued)

(52) U.S. Cl.
CPC .......... *B61L 27/70* (2022.01); *B61L 15/0027* (2013.01); *B61L 23/042* (2013.01); *B61L 27/53* (2022.01);
(Continued)

(58) Field of Classification Search
CPC .......... B61L 27/70; B61L 27/53; B61L 27/57; B61L 15/0027; B61L 23/042; G06N 3/04; H04L 63/1416; H04L 63/1425
See application file for complete search history.

(56) References Cited

U.S. PATENT DOCUMENTS

2006/0180709 A1 * 8/2006 Breton ................ H04L 61/2514
246/1 C
2012/0198277 A1 8/2012 Busser et al.
(Continued)

FOREIGN PATENT DOCUMENTS

DE 102010027131 1/2012
EP 2892199 7/2015
(Continued)

OTHER PUBLICATIONS

Office Action dated May 31, 2021 for Japanese Application No. 2020-573556 filed Nov. 13, 2020.
(Continued)

*Primary Examiner* — Russell Frejd
(74) *Attorney, Agent, or Firm* — A.C. Entis-IP Ltd.; Allan C. Entis

(57) ABSTRACT

A cyber security system for providing security to a railway system, the system comprising: a data monitoring and processing hub; a network of data collection agents configured to monitor communications transmitted between railway infrastructure and/or rolling stock entities and mirror the communications to the hub; wherein the processing hub comprises computer executable instructions executable to: process the mirrored communications to determine normative patterns of communications between the entities; use the normative patterns to determine sequences of related communications; determine characteristic features of the determined communications sequences; and use the determined characteristic features to determine whether a given com-
(Continued)

munication mirrored to the hub by a data collection agent of the network of data collection agents is anomalous.

20 Claims, 6 Drawing Sheets

(51) Int. Cl.
  *B61L 23/04* (2006.01)
  *B61L 15/00* (2006.01)
  *B61L 27/53* (2022.01)
  *B61L 27/57* (2022.01)
  *H04L 29/06* (2006.01)

(52) U.S. Cl.
  CPC .............. *B61L 27/57* (2022.01); *G06N 3/04* (2013.01); *H04L 63/1416* (2013.01); *H04L 63/1425* (2013.01)

(56) References Cited

U.S. PATENT DOCUMENTS

| | | | |
|---|---|---|---|
| 2014/0107875 | A1 | 4/2014 | Beyer et al. |
| 2017/0149820 | A1 | 5/2017 | Ruvio et al. |
| 2018/0191758 | A1 | 7/2018 | Abbaszadeh et al. |
| 2019/0141070 | A1* | 5/2019 | Tsurumi ............. H04L 63/1416 |
| 2020/0145382 | A1* | 5/2020 | Shmueli ............. H04L 63/0421 |
| 2021/0058409 | A1* | 2/2021 | Shmueli ............. B61L 27/0005 |
| 2021/0392031 | A1* | 12/2021 | Ali-Tolppa ............ H04L 41/065 |

FOREIGN PATENT DOCUMENTS

| | | |
|---|---|---|
| EP | 28292202 | 7/2015 |
| EP | 3150460 | 4/2017 |
| EP | 3553682 | 10/2019 |
| EP | 3656643 | 10/2020 |
| JP | 2007243338 A | 9/2007 |
| JP | 2015030274 A | 2/2015 |
| JP | 2016159784 A | 9/2016 |
| WO | 2014061021 | 4/2014 |
| WO | 2014144857 | 9/2014 |
| WO | 2016148840 | 9/2016 |

OTHER PUBLICATIONS

Rabatel et al., SO_MAD: SensOr Mining for Anomaly Detection in Railway Data, ICDM: Industrial Conference on Data Mining, Jul. 2009, pp. 191-205.
Zaki, "SPADE: An efficient algorithm for mining frequent sequences". Machine Learning 42(1), 2001, pp. 31-60.
Ribeiro et al.,"Sequential anomalies: a study in the Railway Industry". Machine Learning 105, 2016, pp. 127-153.
Office Action dated Feb. 16, 2021 for Australian Application No. 2020275139, filed Jan. 4, 2021.
International Search Report and Written Opinion dated Feb. 24, 2021, for Application No. PCT/IL2020/051132 Filed Oct. 30, 2020.
Wu Yongdong et al: "Vulnerabilities, Attacks, and Countermeasures in Balise-Based Train Control Systems", IEEE Transactions on Intelligent Transportation Systems, IEEE, vol. 18, No. 4, Apr. 1, 2017, pp. 814-823.
CYRail Recommendations on cybersecurity of rail signalling and communication systems CYbersecurity in the RAILway sector, Sep. 1, 2018, pp. 1-72.
PCT Search Report and Written Opinion dated Oct. 27, 2020 for PCT Application No. PCT/IB2020/054679, Filed May 18, 2020.
International PCT Search Report and Written Opinion dated Sep. 3, 2019 from PCT Application PCT/IL2018/051417 filed on Dec. 31, 2018.
European Extended Search Report dated Mar. 19, 2020 for Application No. 19217919.0, filed Dec. 19, 2019.
Australian Office Action dated Apr. 9, 2020 for Application No. 2018423506 filed Dec. 24, 2019.
Australian Office Action dated Apr. 9, 2020 for Application No. 2019284070 filed Dec. 24, 2019.
Stefan Axelsson Intrusion Detection Systems: A Survey and Taxonomy, Mar. 14, 2000, pp. 1-27.
Sutharshan Rajasegarar, Distributed Anomaly Detection in Wireless Sensor Networks, 2006 10th IEEE Singapore International Conference on Communication Systems, 1 page.
Michael Roche, Time Synchronization in Wireless Networks, Nov. 1, 2006, pp. 1-13.
T Shimeall, Chapter 12—Recognition Strategies: Intrusion Detection and Prevention, Introduction to Information Security, Syngress, 2014, 3 pages.

* cited by examiner

SELF ORGANIZING CYBER RAIL-COP

RELATED APPLICATIONS

The present application is a U.S. National Phase of PCT Application No. PCT/IB2020/054679 filed on May 18, 2020, which claims the benefit under 35 U.S.C. 119(e) of U.S. Provisional Application 62/848,616 filed on May 16, 2019 the disclosure of which is incorporated herein by reference.

FIELD

Embodiments of the disclosure relate to providing cyber security to a railroad system.

BACKGROUND

Modern railroad systems employ technologies such as modern digital processors, sensors, communications systems, and Global Navigation Satellite Systems (GNSSs) to monitor and manage railway operations that provide large transport capacities and span continents. Advanced Rail Traffic Management Systems (ARTMN) for railway operations deployed and/or under development at various levels of sophistication provide real time monitoring and flexible management of train movement that adapts to operational contexts of the trains. The operations of the system generate communication activities between railway entities, which may be railway infrastructure entities, for example, trackside entities, such as signaling apparatus, railroad switches, and train stations, and/or rolling stock entities, for example trains that move on the railway tracks and onboard equipment they carry. The European Rail Traffic Management System (ERTMS) is an example of an ARTMN system that is a software-based railway command, signaling, and communication system, adopted by the European Union as a standard for railway control.

An ARTMN operates railway trackside infrastructure entities that cooperate to lock down and dedicate track sections to configure and schedule track routes for safe passage of trains between stations and prevent conflicting movement of the trains. The cooperating infrastructure entities and a controller or controllers that controls the entities are referred to as an interlocking system and are conventionally referred to by an acronym "IXL". An IXL is typically considered to comprise trackside signaling and monitoring apparatus, machinery such as switches at track junctions, gates at level crossings, and computers that control and lock down sequences of states of the trackside apparatus and machinery to prevent conflicting rolling stock movement along the railway track.

In an ERTMS railway, an IXL operates in cooperation with at least one Radio Block Center, (RBC) to control train movement along locked down scheduled track routes. The IXL and RBC communicate with and receive input from a Central Traffic Control, (CTC), regarding routing schedules of rolling stock movement along railway track. A railroad or railway system typically has many IXL and RBC systems, each responsible for a given geographical zone. The IXL geographical zone boundaries in a railway system are independent of and may be different than the RBC geographical zone boundaries.

SUMMARY

An aspect of an embodiment of the disclosure relates to an autonomous apparatus operable to provide a railroad system with continuous protection of railway operations against cyber incursion. The apparatus which may be referred to as a Cyber Railway Continuous Operations Protector, "Cyber Rail-COP", or more simply "Rail-COP", is configured to monitor communication between railway entities, which may be railway infrastructure entities and/or rolling stock entities, to autonomously determine identities of the entities and normative patterns of communications between the identified entities. Normative patterns of communications are patterns of communications, and/or communications, that are considered to be free of cyber-infringement. The communications may comprise communications between any combination of two or more infrastructure entities and/or rolling stock entities. Normative patterns, optionally referred to as baseline patterns, of communications are communications patterns that are exhibited by the entities when their respective functionalities are not affected by a cyber incursion. Cyber Rail-Cop uses the normative communications to vet the railroad entities for proper operation in real time and identify anomalous communications between monitored entities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
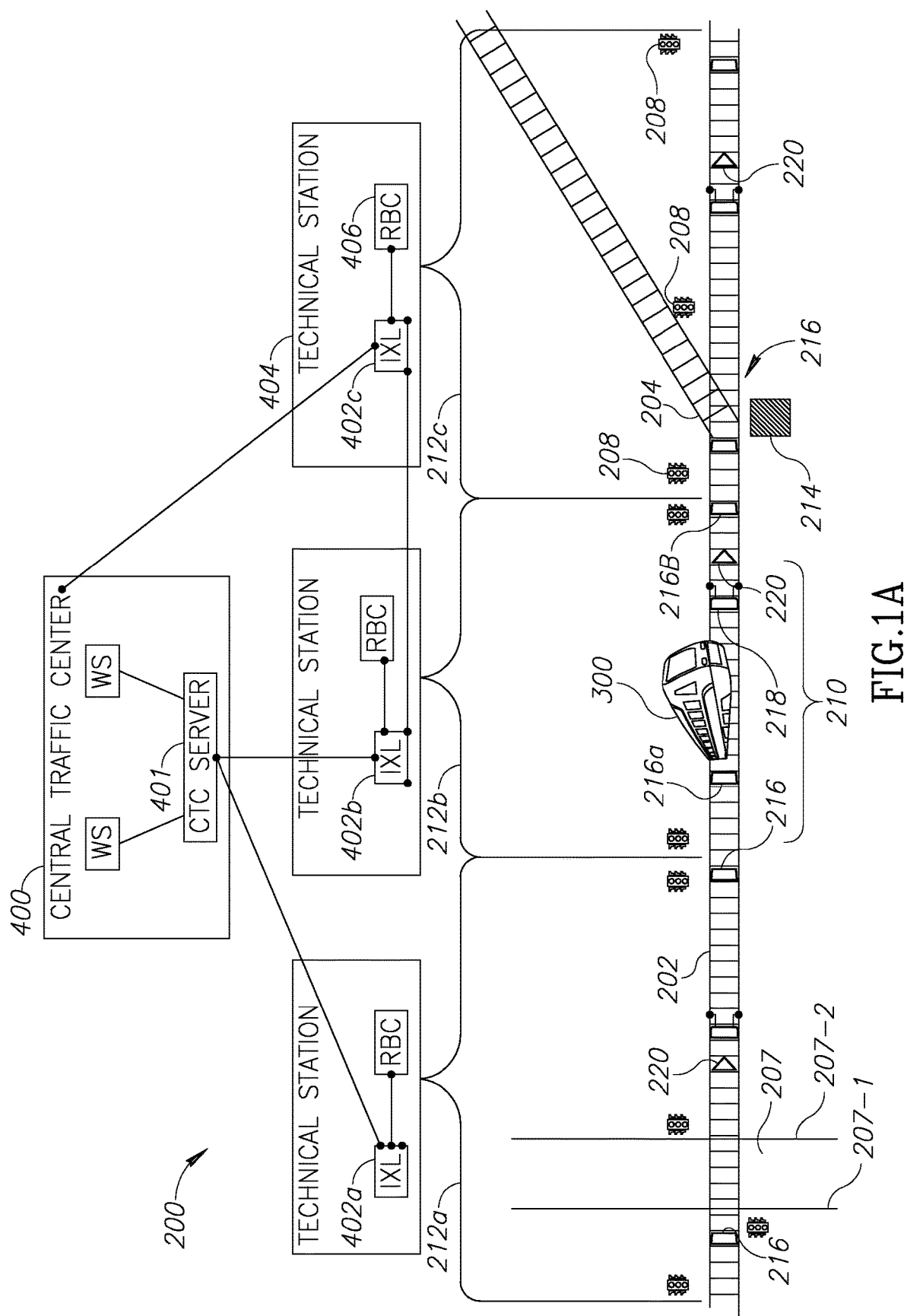
FIG. 1A schematically shows a railway system comprising a plurality of IXL geographical zones.
Figure 1B:
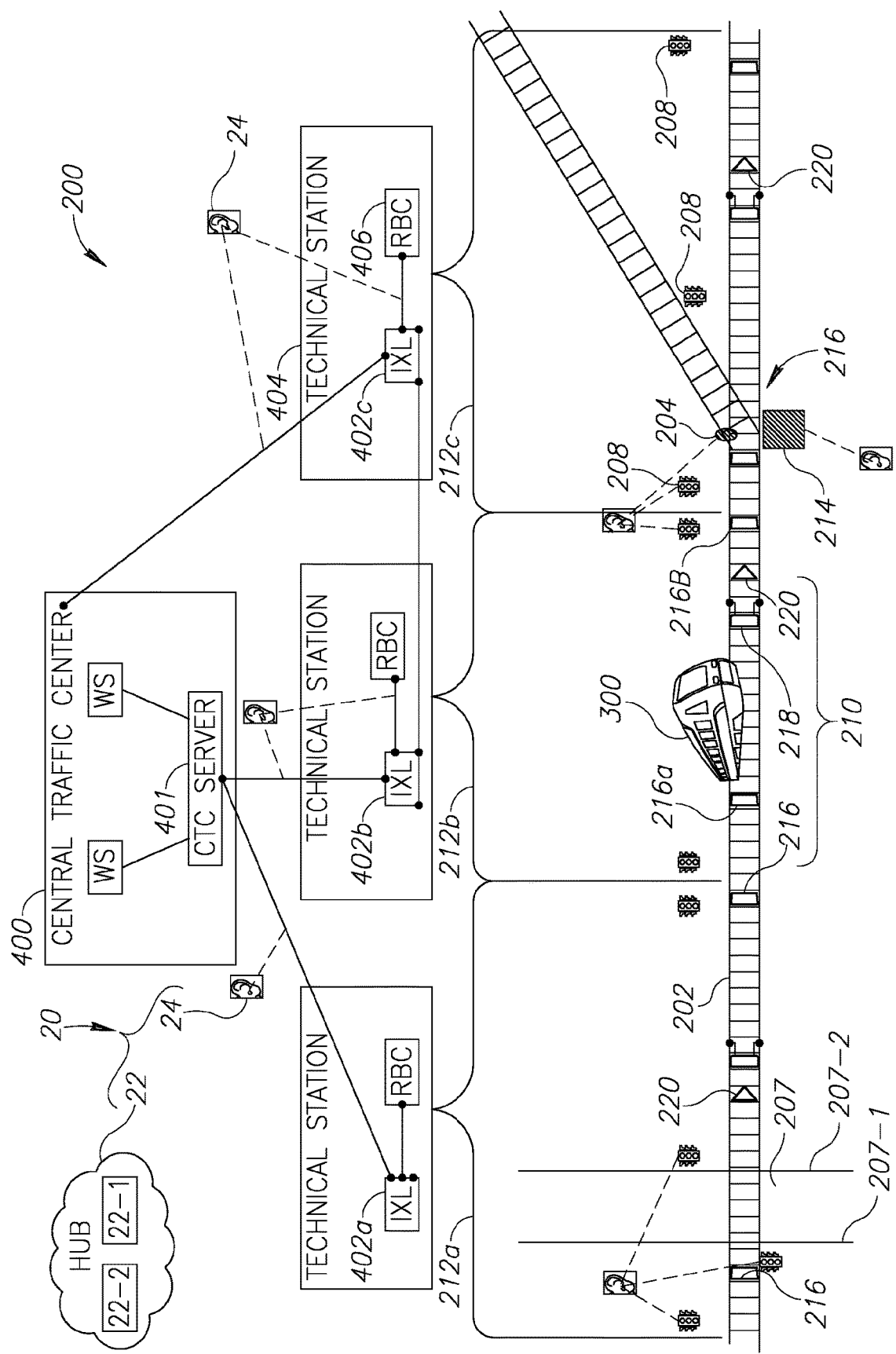
FIG. 1B schematically shows a Rail-COP apparatus for monitoring communications between entities in a railway system, in accordance with an embodiment of the disclosure.
Figure 2A:
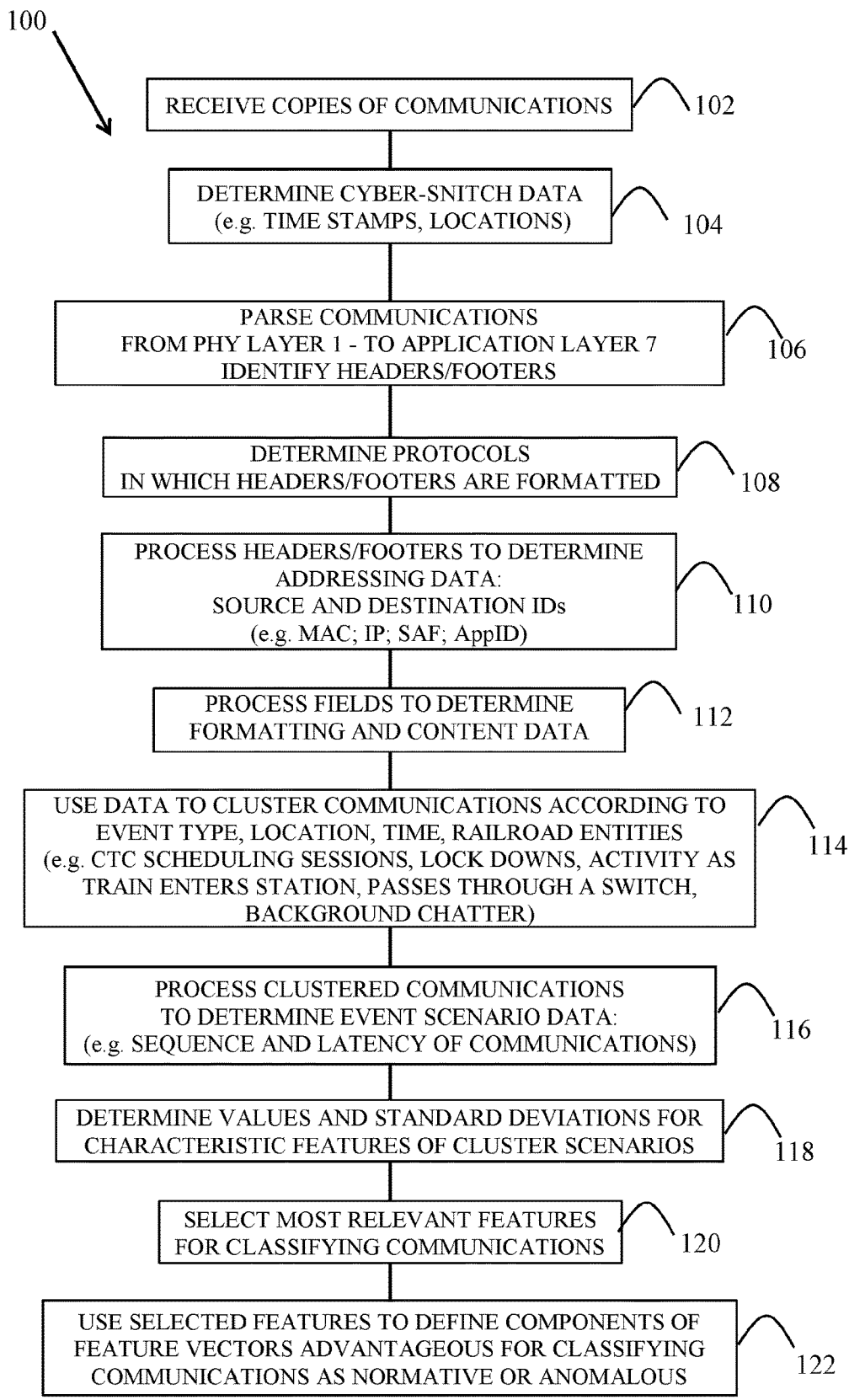
FIG. 2A is a flow diagram schematically illustrating how a Rail-COP determines a normative pattern of communications between entities of a railway system, in accordance with an embodiment of the disclosure.
Figure 2B:
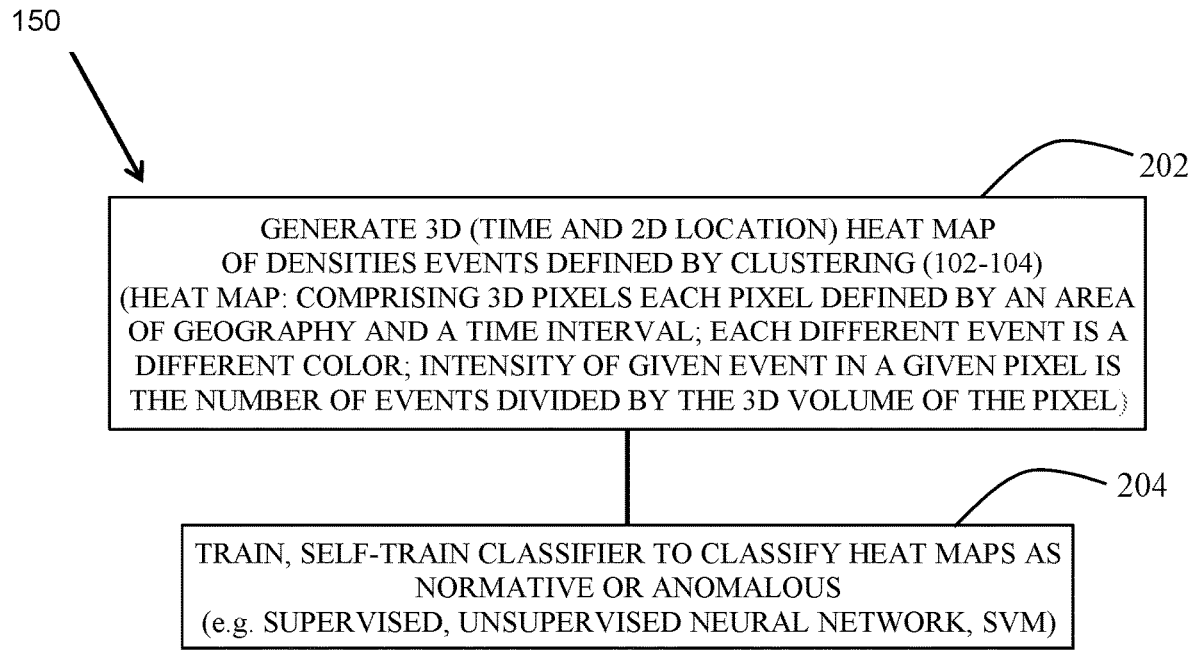
FIG. 2B is a flow diagram schematically illustrating how a Rail-COP determines a heat map for a railway system and uses a classifier to determine if the heat map is normative or anomalous, in accordance with an embodiment of the disclosure.
Figure 3A:
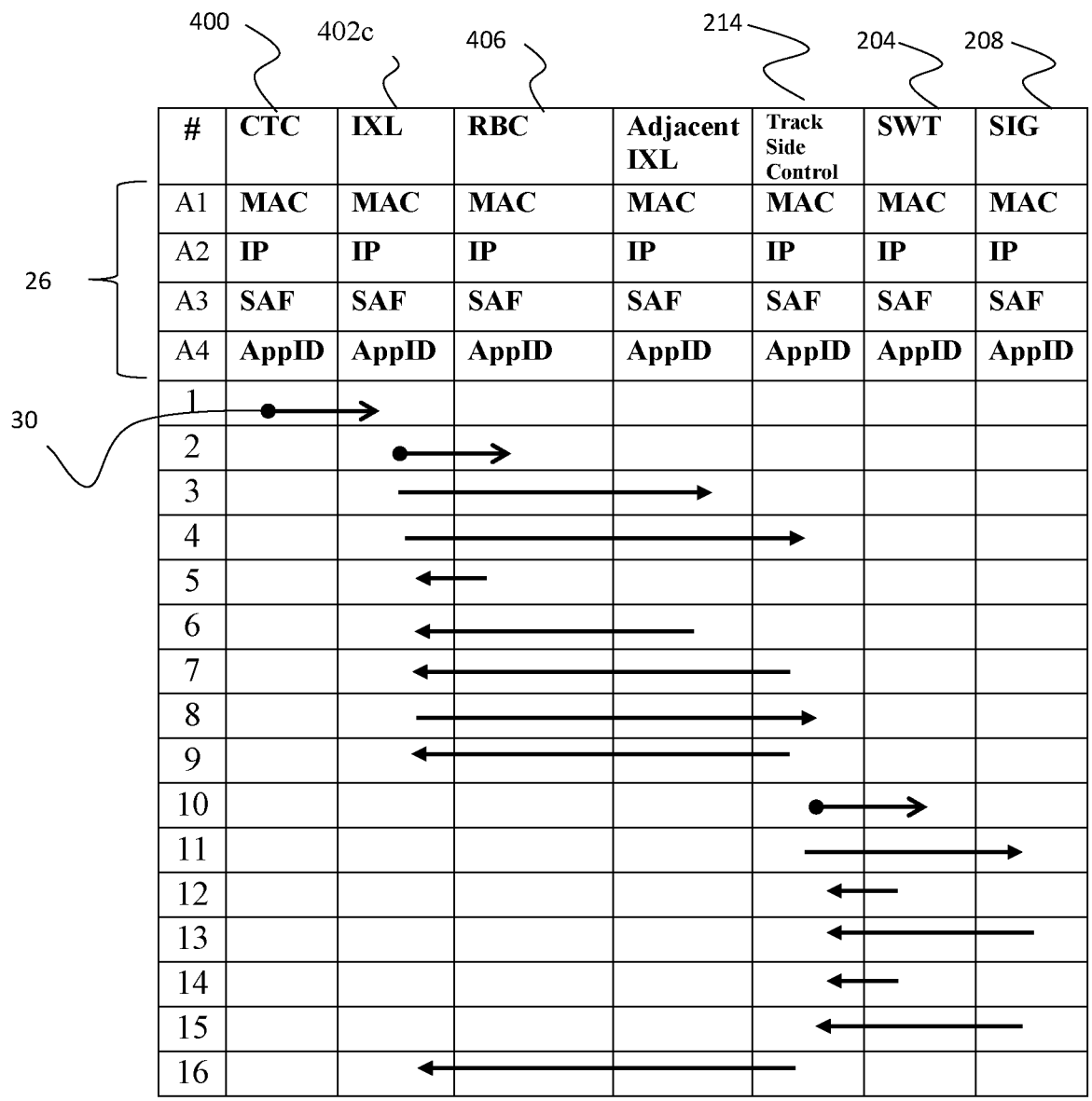
FIG. 3A schematically shows an example of a normative cascade of communications between railway infrastructure entities of an IXL while handling a particular event.
Figure 3B:
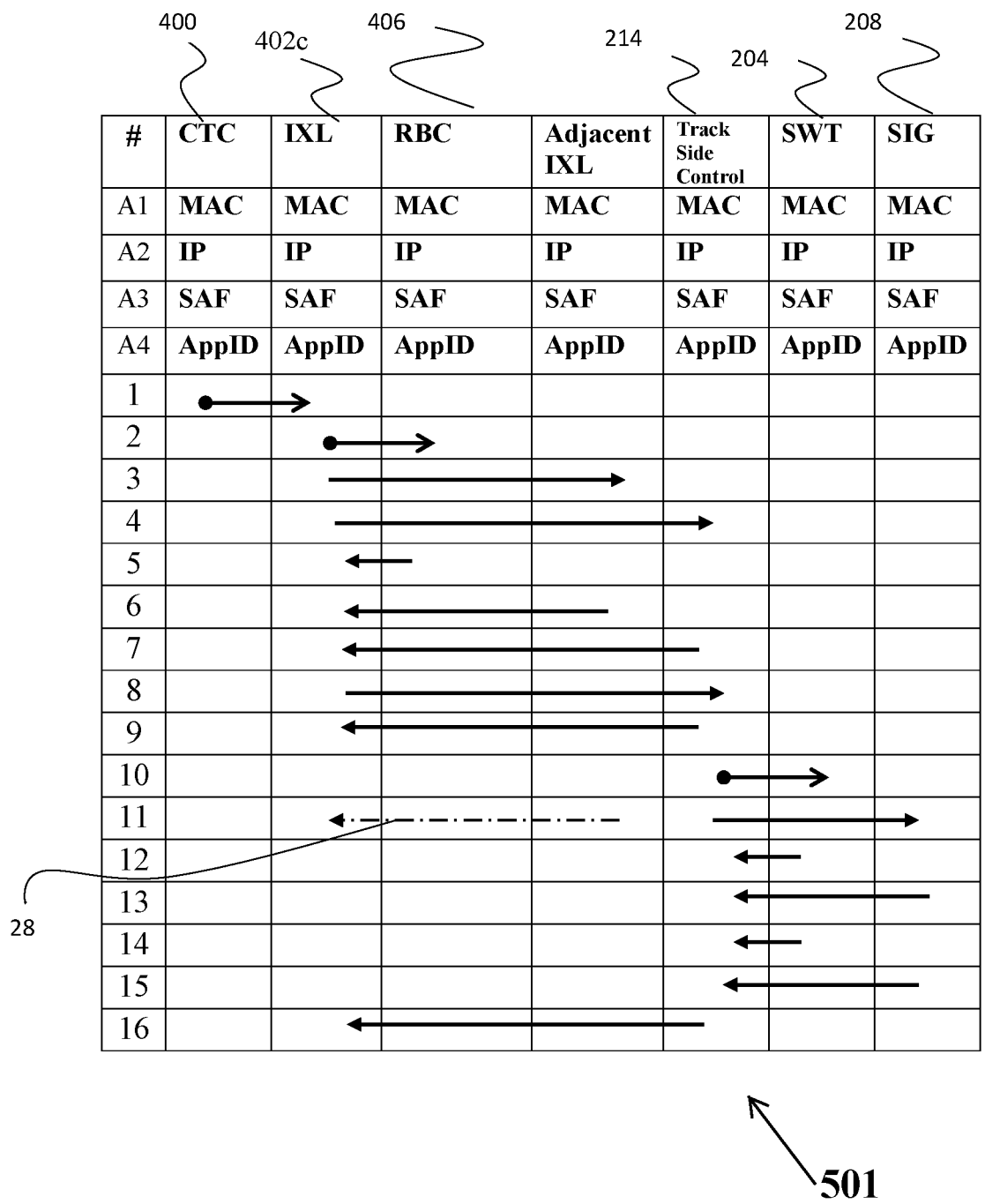
FIG. 3B schematically shows an example of the cascade of communications shown in FIG. 3A that includes a communication that Rail-COP identifies as a communication that may indicate a cyber-attack on the IXL, in accordance with an embodiment of the disclosure.

In the following detailed description, a Rail-COP operating to provide cyber security to a railway system in accordance with an embodiment is discussed with reference to FIGS. 1A-3B. FIG. 1A shows a schematic representation of a railway system comprising a plurality of IXL geographical zones. FIG. 1B illustrates the railway system with Rail-COP monitoring communications between entities in the railway system during normal operation of the railway system to establish normative patterns of communication for the railway system. FIG. 2A is a flow diagram illustrating a procedure by which Rail-COP may self-organize to determine normative patterns of communications between the entities, in accordance with an embodiment of the disclosure and classify communications between railroad entities as normative or anomalous. FIG. 2B is a flow diagram illustrating a procedure by which Rail-COP defines a heat map for a railway system and uses a classifier to determine if the heat map is normative or anomalous. FIGS. 3A and 3B show charts that schematically illustrate an example of a normative cascade of communications exhibited by an IXL for a particular event, in which a track is locked down to facilitate safe movement of an approaching train from one track to a second track at a track junction. FIG. 3B deals with the same cascade shown FIG. 3A disturbed by an anomalous communication that is identified by Rail-COP in accordance with an embodiment of the disclosure.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIGS. 1A and 1B schematically show a railway system 200. The railway system comprises tracks 202 along which trains, represented by a train 300, move to transport passengers and/or cargo. Railway system 200 further comprises infrastructure entities such as a switch 204, trackside signal apparatus represented by traffic lights 208, a train detection system 210, and a level crossing 207 shown delimited by two parallel lines labeled 207-1 and 207-2. Railway system 200 is shown by way of example having three IXL geographical zones 212a, 212b and 212c, which may be referred to generically by their common numerical prefix 212. Railway system 200 comprises IXLs 402a, 402b, and 402c, generically referred to by their common numerical prefix 402, which comprises and manage infrastructure equipment in zones 212a, 212b and 212c respectively. For example, IXL 402b manages the infrastructure equipment for zone 212b. For convenience of presentation, in FIGS. 1A and 1B, labels 402a, 402b, and 402c are shown labeling controllers of their respective IXLs. Each IXL 402 interacts and communicates with one or more adjacent IXLs that monitor geographical zones contiguous with the IXL. In the current example, IXL 402b has adjacent IXLs 402a and 402c that control and monitor the track of IXL geographical zones 212a and 212c contiguous with IXL zone 212b, and from which IXL 402b would receive information to lock down and monitor routes for train 300.

Each IXL 402 may comprise, control, and/or communicate with at least one or any combination of more than one of the following infrastructure entities of railway 200: a switch 204; a trackside signal light 208, and at least one component entity of train detection system 210. Switch 204 comprises apparatus at a track junction 206 that guides a train from one track to another for example. The signal light, conventionally referred to as a "signal", is a trackside device, typically a color light display device, operable to visually transmit to a train driver by color of lights that the signal displays, information relating to the state of track ahead of a train that the train driver is driving, and/or actions the train driver should undertake. For example, a signal 208 might inform the train driver if another train occupies the track ahead of the train and signal the train driver to stop the train.

The train detection system of an IXL may comprise at least one of a plurality of different types of train detection devices, usually positioned between the rails of the track to detect when a train 300 is on a given segment of track 202. The train detection devices may comprise axle counters 216 and/or track circuits 218.

An axle counter 216 generally comprises a pair of axle sensors that sense train axles as the axles pass over the sensors. The order in which the sensors sense a given axle indicates a direction in which the train is moving as it passes over the sensors. A segment of track in a railway system may comprise at least two axle counters, one at each end of the track segment. For example, train detection system 210 comprises an axle counter 216-A and 216-B at opposite ends of the track section in geographical zone 212b. As a train 300 passes, each of the axle counters 216-A and 216-B counts a number of axles that pass over the counter. The numbers of axles counted by the counters are compared to determine if the train has passed through and left the section of track in geographical zone 212b. If the numbers of axles counted by axle counters 216-A and 216-B are the same, the track section is presumed to be clear for another train.

A track circuit 218 detects the presence of a train in a section of tracks 202 by electric circuitry. An electric circuit on the section of track is shorted out by the wheels and axles of a train on the track that conductively connect the two rails of track 202. During the circuit short there is a train 300 on that segment of track 202.

Track detection system 210 may further comprise a passive electronic beacon 220, referred to as a balise mounted between the rails of a track. The balise receives energy from a train passing over the balise and uses the energy to transmit information to the train in a communication referred to as a telegram. The telegram typically comprises a unique identification of the balise which provides the train with the train location along the track as it passes over the balise and might inform the train of train speed limits and track gradients for the location. If the balise is a transparent balise, it may be operated to provide a movement authority to the train.

In addition an IXL may comprise a plurality of generic input and output infrastructure entities that may be needed for management of trackside infrastructure entities along a route of track, such as level crossings 207, movable bridges (not shown), hot wheel boxes (not shown), and/or avalanche detection systems (not shown). The hot wheel box physically sits in a trackside cabin (not shown) next to track 200. The hot wheel box monitors the wheels of rolling stock 300 as they pass the track side box. Different factors including for example friction due to misalignment of equipment, may result in a train wheel, wheel axle, or train brakes heating up to unsafe temperatures. The hot wheel box transmits a communication to the IXL of any unusual temperatures associated with a particular wheel of a particular rolling stock, for example train 300.

The IXL may, as schematically shown for IXL 402C, further comprise a trackside controller 214, which may be used as an intermediary between the IXL and some of the trackside infrastructure entities such as switches 204 and signals 208. Switches 204 and signals 208 in some railways may be wired for communications and not capable of handling wireless communications. Therefore, if the IXL sends and receives wireless communications for controlling trackside equipment, intermediary trackside controller 214 is configured to send and receive wireless communications from the IXL and transmit these communications to and from the switches and the signals via wire.

By way of example, and as schematically illustrated in FIGS. 1A and 1B, railway system 200 further comprises a CTC 400, which may comprise a CTC server 401. The CTC and the CTC server are usually responsible for setting up the train schedules and communicating that information via the ARTMN, to all the IXLs 402 and RBCs 406 of railway 200. The RBC and IXL controller may be housed in a technical station 404, which may be a regular station used for passenger and/or cargo transfer (not shown) and also for housing computing equipment that supports operation of the railway system. Communications between an IXL, RBC and the CTC are schematically represented in the figures by lines with solid circular endpoints. The IXL is represented in the figures as communicating with only one RBC per IXL region, however the IXL may communicate with more than one RBC in a given IXL zone. Optionally, the IXL may discern movement of trains through train detection systems 210 and not communicate with an RBC.

A Rail-COP 20 in accordance with an embodiment of the disclosure is schematically shown in FIG. 1B cyber-guarding railway system 200. In an embodiment, Rail-COP 20 comprises an optionally cloud-based hub 22, and a distributed network of communication agents, also referred to as "cyber-snitches" represented by "ear icons" 24, that are configured to eavesdrop on and mirror communications between entities in railway system 200 to hub 22 for processing. Hub 22 optionally has access to cloud-based memory 22-1 and processing resources 22-2 configured to support functionalities that Rail-COP provides. Memory 22-1 and processing resources 22-2 may comprise any combination of hardware and/or software components, advantageous for supporting their respective functionalities.

Entities and communication channels of railway system 200 that a given cyber-snitch is optionally eavesdropping on are schematically shown connected to the given cyber-snitch by a dashed line.

Cyber-snitches 24 may be coupled to any of various infrastructure and/or rolling stock communication nodes or channels of railway 200 to monitor communications of the railway. If the communications are propagated over wireless channels, cyber-snitches 24 may be configured having antennas suitable to receive the communications. Additionally, or alternatively, for communications propagated by wire, cyber-snitches 24 may be connected by wire to a wire channel to receive copies of the communications. In an embodiment, a cyber-snitch 24 may be coupled wirelessly to a wire channel, which may be an electrically conductive wire or optical fiber communications channel, to pick up electromagnetic fields that the communications generate and leak from the wire channel, to receive copies of the communications.

In an embodiment, Rail-COP hub 22 processes copies of received communications to determine normative patterns of communications between entities of railway system 200 engaged in the communications and features that characterize normative patterns of the communications. Optionally, Rail-COP hub 22 stores the received communications in a communications database and is configured to process communications in the database to learn how to distinguish and classify communications as normative, or anomalous and indicative of a possible cyber-attack. Optionally, Rail-COP hub 22 comprises a rule-based system for providing an initial classification of received communications. In an embodiment, communications classified by the rule-based system may be used to teach a supervised neural network to distinguish anomalous communications that may indicate a cyber-attack on railway 200. Subsequent to being taught, and/or while being taught the neural network may be used to classify in real time communications as normative or anomalous. The database of received communications may be constantly updated with new communications and the updated database periodically used to reteach the neural network. In an embodiment an, optionally unsupervised, neural network may be used to process communications in the database and learn to distinguish in real time normative from anomalous communications. The unsupervised neural network may constantly update itself as communications are mirrored to hub 22 and accumulated.

By way of example, Rail-COP hub 22 may use a neural network to cluster communications between entities of railway 200 to determine normative communications that are causally related, and identify sequences of normative, causally related communications with events in the railway with which the communications are associated. For example, Rail-COP hub 22 may cluster communications which are transmitted between railway 200 infrastructure entities to associate communications with events such as: reporting train locations to RBCs responsive to messages transmitted by balises 220; reporting track occupation based on axle counters 216 and/or track circuits 218; locking down a train route; and/or communications associated with an "IXL event", that are transmitted between a train, an RBC, and/or IXL infrastructure entities at and in a neighborhood of a given physical location, such as a particular railroad switch, level crossing, or station, as the train approaches the location. Rail-COP 22 may process clustered communications to associate the communications with a given event, optionally for a particular location and/or time, to determine characteristic features that characterize the communications associated with the given event. For example, Rail-COP 20 may process the communications to identify source and destination IDs and addresses comprised in headers of the various protocol layers, such as by way of example, the physical, transport, safety and application layers, of the communications. Rail-COP 22 may determine that the identified IDs and addresses are normative features of communications activity associated with the given event. Rail-COP 20 may also process the communications to, determine temporal sequences of the normative communications for the given event, and/or normative delay times, also referred to as latencies, between transmissions of the communications and/or responses to the communications.

Rail-COP 22 may parse and process fields in the protocol data units (PDUs) in which the communications are formatted to identify normative content of the fields. Rail-COP 22 may analyze parsed communications for specific values of fields, payloads, telegram structure, and/or other components of the communications. In some embodiments Rail- COP analyzes railway specific safety protocols, for example, the Rail Safe Transport Application (RaSTA) protocol. Once a RaSTA protocol communication is identified, Rail-COP may analyze the communication at an application layer to determine source and destination IDs for the entities participating in the communication and use the identities to label the entities in other communications in which they are involved.

In an embodiment the identified normative features are optionally used to determine which of the features are advantageous for use as components of a feature vector for a communication that may be used to classify whether the communication is normative or anomalous. In an embodiment a support vector machine (SVM) may be used to determine whether a feature vector for a give communication indicates that the communication is normative or anomalous.

FIG. 2A shows a flow diagram 100 of a procedure that Rail-COP 20 may execute to determine normative communications activities or communications patterns between entities of a railway system, such as railway system 200, in accordance with an embodiment of the disclosure.

In a block 102 of procedure 100, Rail-COP hub 22 receives copies of communications between entities of railway 200 that are monitored by cyber-snitches 24. In block 104, Rail-COP 20 determines cyber-snitch data which may comprise time stamps and geographical locations. In block 106, the Rail-COP procedure parses communications from physical layer 1 to application layer 7 to identify headers and footers. In block, 108 Rail-COP determines the protocols in which the headers and footers are formatted. Each layer from physical layer 1 to application layer 7 has identifiers associated with the layer for example, a MAC ID for Ethernet, an IP address for the internet protocol, a safety ID for the safety layer, and an application ID for the application layer. The headers and footers from the procedure of block 108 are processed by Rail-COP, in block 110, to determine addressing data such as source and destination IDs, which may be MAC, IP, SAF and Application IDs.

In block 112 the Rail-COP procedure may continue to process fields of the communications to determine formatting and content data. In an embodiment in block 114 Rail-COP uses the data to spatiotemporal cluster communications according to event type, location, time, and/or railroad entities. The data may by way of example comprise CTC Scheduling sessions, lock downs, activity as a train enters a station, activity as a train passes through a switch, and background chatter. In block 116 Rail-COP may process communications clustered to a given event type in block 114 to determine event scenario data, such as a sequence of communications and/or latencies between communications for the event. In a block 118 Rail-COP 20 may determine at least one or any combination of more than one of mean values, standard deviations, and/or other moments for characteristic features of clustered communications and the events to which they belong to determine respective normative sequences of communications for the events. In a block 120 of the procedure Rail-COP optionally selects values for the most relevant features for classifying communications as anomalous or normative. The selected features of a given communication transmitted or received by an entity may comprise at least one or any combination of more than one of geographic location of the entity, order in a sequence, a latency relative to another communication in the sequence, value of a particular field, such as a reserved field in the communication, a security level of the communication, or any of various context features for a time and location of the entity. Context features may by way of example comprise speed of a rolling stock from which the entity, if it is an on-board entity, transmits or receives the given communication, a weather conditions, a track conditions, or magnitude of communication traffic. In an embodiment, in a block 122 Rail-COP may use values of the selected features to define components of feature vectors advantageous for classifying communications as normative or anomalous.

FIG. 2B shows a flow diagram 150 of a procedure that Rail-COP 20 may execute to define a heat map for a railway system 200 and use a classifier to determine if the heat map or a region thereof is normative or anomalous. In block 202 rail-COP generates a 3D heat map which may comprise 3D voxels where each voxel is defined by an area of geography and a time interval. The 3D heat map may exhibit densities of events for a given classes of events defined by clustering events as discussed with respect to flow diagram 2A above. Rail-COP 20 may generate a visual display of the heat map in which different classes of events are optionally depicted by different colors or symbols.

An event intensity for a given class of events in a given voxel of the heat map may be equal to a number of events of the given class in the voxel divided by the 3D volume of the voxel. The event intensity for a given class of events in a voxel is expected to be a function of various different variables. For example, the event intensity is expected to be a function of time, and may exhibit changes as a function of time of day, day of the week, or month of the year. Intensity may also exhibit changes as a function of weather and/or track conditions, and/or congestion of rolling stock traffic. In a block 204, Rail-COP optionally configures at least one classifier or any combination of more than one classifier such as an, optionally convolutional, neural network, a support vector machine (SVM), and/or a K-means classifier to distinguish spatiotemporal patterns for a spatiotemporal region of a Rail-COP heat map or a full spatiotemporal span of the heat map and classify the region or span the heat map as normative or anomalous. A classifier of the at least one classifier may by way of example, be a supervised classifier such as a supervised neural network. Alternatively, or additionally, a classifier of the at least one classifier may be an unsupervised neural network.

FIG. 3A schematically shows, an example cascade table 500, of a normal cascade of communications between entities of IXL 402c (FIGS. 1A, 1B) that cooperate in handling a given event, which may also be referred to by the numeral 500, at junction 206. The left column of FIG. 3A indicates a sequential step number of the communication exchanges. In the example, the given event is assumed to be a track lock down in which switch 204 at junction 206 (FIGS. 1A, 1B) cooperates with related light signal 208 to facilitate safe movement of train 300 from a first track to a second track at the track junction. Each entity listed in column headings of FIGS. 3A and 3B is associated with the identifiers 26, which in accordance with an embodiment Rail-COP 20 may have determined from clustering analysis referred to in the discussion of flow diagram 100 (FIG. 2A). Rail-COP 20 may use the communications and identities shown in FIG. 3A to determine a normal sequence of events for junction 206 and which entities associated with the junction are expected to transmit and receive particular communications during occurrence of the event. Features of the communications, such as those referred to in blocks 116-120 of flow diagram 100, may be used to provide components of feature vectors for processing by Rail-Cop 20, optionally using an AI, to determine if similar events at junction 206 are anomalous or not. Each communication in FIG. 3A sent between participating entities is schematically represented by arrows 30.

In a step 1, CTC 400 sends the schedule of trains to IXL 402c. After processing which track routes are required to comply with the schedule set by the CTC, the IXL sends communication to three entities in steps 2-4. The IXL requests status information from RBC406, adjacent IXLs of IXL 402c, one of which, IXL 402b, is shown in FIGS. 1A and 1B, and the track side control 214 respectively. The RBC, the adjacent IXLs and the track side control send back the information requested by the IXL in steps 5-7. Step 8 illustrates the IXL sending a communication to the track side control requesting that the switch and the signal perform the particular event. In step 9, the track side control sends back confirmation communication that it received the request of step 8. Steps 10 and 11 indicate the trackside control requesting that the switch and the signal accomplish the required tasks. In steps 12 and 13, the switch and the signal confirm they received the request communication from the track side control, and after they complete their tasks, in steps 14 and 15 the signal and switch update track side control 214 of task completion. Finally, in step 16 track side control 214 updates IXL 402c that the particular tasks were performed.

FIG. 3B shows a cascade table 501 for an event, also referred to by the numeral 501, at junction 206 similar to event 500 associated with cascade table 500 shown in FIG. 3A except that cascade table 501 exhibits a possibly anomalous communication between an adjacent IXL and the RBC schematically represented by dashed line 28. Having determined based on analysis of previous events at junction 206 in accordance with an embodiment of the disclosure normative patterns of communication for events at junction 206, Rail-COP 20 identifies communication 28 as anomalous. In response to identifying the anomalous communication 28 Rail-Cop may generate an alarm to alert an operator of Railway system 200 or train 300 to a possible malfunction of equipment at junction 206 or a cyber incursion associated with the junction. In an embodiment Rail-Cop 20 configures the alarm to indicate possible severity of consequences to safety of movement through the junction.

In order to improve reliability of identification of a possible cyber-attack, Rail-COP may operate to correlate communications received from a plurality of IXL zones and may even receive communications from railway and/or rolling stock entities in a plurality of geographical regions to improve reliability of an identification of a cyber-attack. For example, as in the case of a malfunction of railway equipment giving rise to a suspicion of a cyber-attack, malfunction and/or weather conditions may affect operation of equipment and give rise to a determination that there is a suspicion of a cyber-attack. By correlating data received from a plurality of entities and geographical regions, Rail-COP may improve reliability of a determination that the suspicion is due to an actual cyber-attack.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A cyber security system for providing security to a railway system, the system comprising:
    a data monitoring and processing hub;
    a network of data collection agents configured to monitor communications transmitted between railway infrastructure and/or rolling stock entities and mirror the communications to the hub;
    wherein the processing hub comprises computer executable instructions executable to:
        process the mirrored communications to determine normative patterns of communications between the entities;
        use the normative patterns to determine sequences of related communications;
        determine characteristic features of the determined communications sequences; and
        use the determined characteristic features to determine whether a given communication mirrored to the hub by a data collection agent of the network of data collection agents is anomalous.

2. The cyber security system according to claim 1 wherein using the normative patterns to determine sequences of related communications comprises clustering the communications to determine communications belonging to same sequences of communications.

3. The cyber security system according to claim 1 wherein using the normative patterns to determine sequences of related communications comprises using an artificial intelligence (AI) to determine communications belonging to same sequences of communications.

4. The cyber security system according to claim 1 wherein determining characteristic features of the determined sequences comprises associating the determined sequences with types of railway system events that engendered the sequences.

5. The cyber security system according to claim 4 wherein determining characteristic features of the determined sequences comprises associating the engendering events with respective geographical locations of occurrence of the railway system events.

6. The cyber security system according to claim 4 wherein determining characteristic features of the determined sequences comprises associating the engendering railway system events with relevant times of occurrence of the events.

7. The cyber security system according to claim 6 wherein a relevant time of a railway system event comprises at least one or any combination of more than one of a time of day, day, or date.

8. The cyber security system according to claim 1 wherein determining characteristic features of the determined sequences comprises determining a temporal order of the communications belonging to a sequence of the determined sequences.

9. The cyber security system according to claim 8 wherein determining characteristic features of the determined sequences comprises determining an average and variance for a latency between communications belonging to a sequence of the determined sequences.

10. The cyber security system according to claim 9 and determining an additional statistical moment for the latency between the communications.

11. The cyber security system according to claim 1 wherein determining characteristic features of the determined sequences comprises determining a value of a field in a communication belonging to a sequence of the determined sequences.

12. The cyber security system according to claim 1 wherein determining characteristic features of the determined sequences comprises determining a security level of a communication belonging to a sequence of the determined sequences.

13. The cyber security system according to claim 1 wherein determining characteristic features of the determined sequences comprises determining at least one feature characterizing a context for a communication belonging to a sequence of the determined sequences.

14. The cyber security system according to claim 13 wherein the at least one feature comprises at least one or any combination of more than one of a weather condition, a track condition, a speed of a rolling stock, or a magnitude of communication traffic between the railway entities.

15. The cyber security system according to claim 1 wherein using the characteristic features comprises:
determining normative feature vectors for communications transmitted between railway infrastructure and/or rolling stock entities based on at least one or any combination of more than one of the characteristic features: and
determining a feature vector for the given communication based on data that the communication comprises; and
comparing the feature vector for the given communication with the normative feature vectors to determine if the given communication is anomalous.

16. The cyber security system according to claim 15 wherein determining the feature vector for the given communication and comparing the feature vector to determine if the given communication is anomalous is performed in real time.

17. The cyber security system according to claim 1 wherein the computer executable instructions are executable to process the mirrored communications to generate a 3D heat map of a number each event of a selection of events occurring in the railway system as a function of location and time.

18. The cyber security system according to claim 17 wherein the computer executable instructions are executable to determine if the heat map or a region thereof is normative or anomalous.

19. The cyber security system according to claim 18 wherein the computer executable instructions comprise a classifier executable to determine if the heat map or a region thereof is normative or anomalous.

20. The cyber security system according to claim 18 wherein the classifier comprises a convolutional neural network.

* * * * *